United States Patent Office 3,314,972
Patented Apr. 18, 1967

3,314,972
INDOLO[3,2-c]THIOPYRYLIUM COMPOUNDS AND INTERMEDIATES THEREFOR
Thomas E. Young, Bethlehem, Pa., and Peter H. Scott, Guilford, Conn., assignors to Warner-Lambert Pharmaceutical Company, Morris Plains, N.J., a corporation of Delaware
No Drawing. Filed May 23, 1966, Ser. No. 551,904
8 Claims. (Cl. 260—326.9)

This application is a continuation-in-part of application Ser. No. 457,820, filed May 21, 1965, for Thiopyrano[4,3-b]Indole Compounds and Process for Their Production, and now abandoned.

This invention relates to indolo[3,2-c]thiopyrylium compounds, and intermediates and processes for their preparation. More particularly, the present invention relates to inodol[3,2-c]thiopyrylium compounds having the following formula:

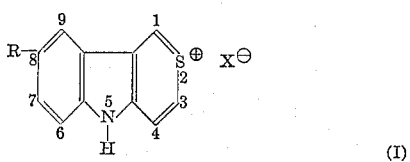

(I)

wherein R is hydrogen, lower alkyl of 1 to 4 carbon atoms, e.g. methyl, ethyl, propyl, isopropyl, butyl, etc., or halogen; and $X^\ominus$ is perchlorate or halide.

The indolo[3,2-c]thiopyrylium compounds of Formula I are useful as antibacterial and antifungal agents, particularly against gram positive bacteria, e.g. *Staphylococcus aureus*, etc., and fungi, e.g. *Candida albicans*, etc.

The compounds of Formula I can be mixed with pharmaceutical adjuvants, and the resulting mixtures formed into salves, ointments, and powders for topical and otic applications.

Topical ointment bases that can be employed with the compounds of Formula I are those standard in the pharmaceutical compounding art, e.g. those having a base composed of one or more of the following: animal fats, animal waxes, essential oils, hydrogenated oils, lanolin, olive oil, paraffins, etc. Examples of the above include wool alcohols, wool fat either alone or mixed with lard or paraffin, hydrogenated palm kernel oil, hydrogenated castor oil, etc. Additionally, oil-in-water and water-in-oil bases described in the United States Pharmacopeia can also be used. Hardening agents such as beeswax can be incorporated in the above.

The compounds of Formula I are employed in a therapeutically effective amount in the above ointment bases. They can be applied to the broken or unbroken skin of the animal body, and water soluble bases can also be used for otic application.

Also, a therapeutically effective amount of a compound of Formula I can be used in a talcum powder base for use as a topical dusting powder. What constitutes a therapeutically effective amount of the compounds of Formula I is dependent on various factors such as the particular base employed, the nature and site of the infection, etc. Generally, amounts ranging from about 0.1 to about 5.0%, e.g. about 1%, in the above ointment and powder bases are advantageously employed, although quantities above and below these amounts can also be employed and are within the scope of the instant invention.

The compounds of the present invention are prepared according to the following reaction scheme:

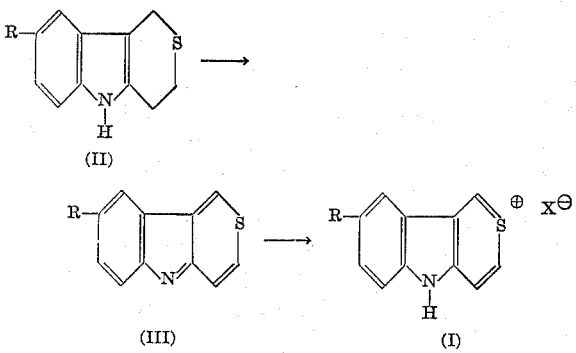

wherein R and $X^\ominus$ have the meanings given for Formula I.

The above reaction scheme is carried out by reacting the compound of Formula II with chloranil in an aromatic hydrocarbon solvent, e.g. xylene, followed by treatment of the reaction product with an aqueous alkali metal hydroxide such as sodium hydroxide, to give the compound of Formula III.

Compound III is then reacted with a hydrogen halide or a perchlorate such as trityl perchlorate to give the corresponding indolo[3,2-c]thiopyrylium compound I.

The practice of the present invention is further illustrated by the following examples:

EXAMPLE 1

*Indolo[3,2-c]thiopyrylium perchlorate*

Into a 1 liter 3-neck flask equipped with stirrer and condenser are introduced 13.4 g. (0.0545 mole) of chloranil, 5.10 g. (0.0270 mole) of 1,3,4,5-tetrahydrothiopyrano[4,3-b]indole [G. M. Bennet and W. B. Waddington, J. Chem. Soc., 2829 (1929)], and 300 ml. of xylene. The deeply colored mixture is then stirred at reflux for five hours. The resulting brown precipitate is collected by filtration, washed with petroleum ether (B.P. 30–40°), air dried and then stirred with 50 ml. of 10% sodium hydroxide for 2 hours. The alkali insoluble residue is collected by filtration, washed thoroughly with water and air dried to give 2.00 g. of ochre yellow powder, which is then sublimed at 140°/0.07 mm. to yield 1.14 g. (23%) of yellow crystals having a M.P. of 168–171° decomp. Two recrystallizations from 1:1 benzene-cyclohexane give golden-yellow needles having a M.P. of 178–179.5°, which are again sublimed to yield pure thiopyrano[4,3-b]indole having a M.P. of 178–180.5°.

Analysis for $C_{11}H_7NS$.—Calc.: C, 71.32; H, 3.81; N, 7.56; S, 17.31. Found: C, 71.37; H, 3.72; N, 7.51; S, 17.07.

To a stirred solution of 1.14 g. of thiopyrano[4,3-b]indole in 12 ml. of glacial acetic acid is added dropwise 1.5 ml. of 71.4% perchloric acid solution. When the addition has been completed, the mixture is stirred an additional 15 minutes, then cooled to 20° C. The precipitate which forms is collected by filtration and washed thoroughly with anhydrous ether. The precipitate is indolo[3,2-c]thiopyrylium perchlorate.

EXAMPLE 2

*8-methylthiopyrano[4,3-b]indole*

The intermediate 8-methyl-1,3,4,5-tetrahydrothiopyrano[4,3-b]indole is obtained by the following procedure: A mixture of 9.45 g. (0.0596 mole) of p-tolylhydrazine hydrochloride, 6.90 g. (0.0596 mole) of tetrahydro-1,4-thiopyrone [E. A. Fehnel and M. Carmack, J. Am. Chem. Soc., 70, 1813 (1948)], and 8.10 g. (0.0596 mole) of sodium acetate trihydrate in 100 ml. of glacial acetic acid is refluxed for 2¼ hours. The resulting mixture is filtered hot to remove insoluble solids and the filtrate allowed to cool to room temperature. The crystals which form are collected by filtration, washed three times with acetic acid, then with petroleum ether (B.P. 30–40°), air dried for one hour and then dried in vacuo over potassium hydroxide. The crude product is found to weigh 8.61 g. and melts mainly at 173–176° but contains a residue which remains unfused up to 350° C. This crude solid is washed throughly by stirring it with water for one-half hour, then redried at 110° for one hour, and finally sublimed at 163°/0.06 mm. to give 6.75 g. (55.8% yield) of product having a M.P. of 174–176°. One recrystallization from glacial acetic acid followed by sublimation at 163°/0.06 mm. gives analytically pure 8-methyl-1,3,4,5-tetrahydrothiopyrano[4,3-b]indole as white crystals having a M.P. of 175–177°.

Analysis for $C_{12}H_{13}NS$.—Calcd.: C, 70.89; H, 6.45; N, 6.89; S, 15.77. Found: C, 71.00; H, 6.71; N, 6.89; S, 15.82

A mixture of 2.03 g. (0.0100 mole) of the intermediate 8-methyl-1,3,4,5-tetrahydrothiopyrano[4,3-b]indole, 4.92 g. (0.0200 mole) of chloranil and 100 ml. of xylene is refluxed for 4 hours then filtered while still hot. The xylene insoluble precipitate is washed with petroleum ether (B.P. 30–40°) and then air dried; 5.20 g. of product are recovered. This dark material is stirred and triturated with 10% sodium hydroxide solution for 4 hours, and the yellow insoluble residue which is collected by centrifugation is washed with water, and air dried. This crude material weighing 1.34 g., M.P. 144–153°, is then extracted with two 25 ml. portions of boiling 1:1 benzene-cyclohexane. The extracts are evaporated to dryness leaving 0.30 g. (15% yield) of yellow crystals having a M.P. of 160–166°. Sublimation at 150°/0.07 mm. gives the pure 8-methyl-thiopyrano[4,3-b]indole as yellow-orange crystals having a M.P. of 171–172°, decomp.

Analysis for $C_{12}H_9NS$.—Calcl.: C, 72.32; H, 4.55; N, 7.03; S, 16.09. Found: C, 72.42; H, 4.49; N, 7.15; S, 15.88.

8-methyl-thiopyrano[4,3-b]indole is then converted to 5-methylindolo[3,2-c]thiopyrylium perhclorate according to the process of Example 1.

EXAMPLE 3

*8-bromothiopyrano[4,3-b]indole*

A mixture of 1.26 g. (0.0047 mole) of 8-bromo-1,3,4,5-tetrahydrothiopyrano[4,3-b]indole [G. M. Bennet and W. B. Waddington, J. Chem. Soc., 2829 (1929)], 2.32 g. (0.0094 mole) of chloranil, and 50 ml. of xylene is refluxed for 4 hours, and then filtered while hot. The crude xylene-insoluble residue is air dried, then stirred with 10% sodium hydroxide until it is reduced to a yellow powder. This material which is collected by centrifugation, washed with water and air dried is found to weigh 0.97 g. and has a M.P. 199–201° decomp. Recrystallization from cyclohexane followed by sublimation at 162°/0.07 mm. gives 0.29 g. (22% yield) of pure 8-bromothiopyrano[4,3-b]indole as yellow crystals having a M.P. of 207–209°, decomp.

Analysis for $C_{11}H_6BrNS$.—Calcd.: C, 50.01; H, 2.29; N, 5.30; S, 12.14. Found: C, 50.22; H, 2.44; N, 5.37; S, 11.95.

8-bromothiopyrano[4,3-b]indole is then converted to 5-bromoindolo[3,2-c]thiopyrylium perchlorate according to the process of Example 1.

EXAMPLE 4

An ointment for topical use is prepared from the following ingredients:

| | Parts by weight |
|---|---|
| Indolo[3,2-c]thiopyrylium perchlorate | 10 |
| Hydrogenated castor oil | 60 |
| Hard paraffin | 160 |
| Soft paraffin | 170 |
| Liquid paraffin | 600 |

The hydrogenated castor oil, hard paraffin, soft paraffin, and liquid paraffin are heated together to form a melt, thoroughly mixed, and the indolo[3,2-c]thiopyrylium perchlorate, in powder form, added thereto with stirring. The resulting mixture is allowed to cool, and then placed in suitable containers.

As used throughout the specification and claims, the terms "halogen" and "halide" are to be understood to include the atoms chlorine, bromine, fluorine, and iodine.

It is understood that the foregoing detailed description is given merely by way of illustration and that many variations may be made therein without departing from the spirit of the invention.

What is claimed is:

1. A compound of the formula:

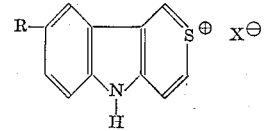

wherein R is hydrogen, lower alkyl of 1 to 4 carbon atoms, or halogen; and $X^\ominus$ is perchlorate or halide.

2. A compound of claim 1 wherein R is hydrogen.
3. A compound of claim 1 wherein R is methyl.
4. A compound of claim 1 wherein R is bromo.
5. A compound having the formula:

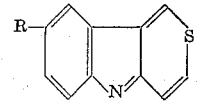

wherein R is hydrogen, lower alkyl of 1 to 4 carbon atoms, or halogen.

6. Thiopyrano[4,3-b]indole.
7. 8-methylthiopyrano[4,3-b]indole.
8. 8-bromothiopyrano[4,3-b]indole.

No references cited.

ALEX MAZEL, *Primary Examiner.*

MARY U. O'BRIEN, *Assistant Examiner.*